Oct. 2, 1956    J. J. PARKER ET AL    2,765,175
HOLDER FOR HOLLOW WORK PIECES

Filed June 28, 1954    2 Sheets-Sheet 1

INVENTORS
JOHN J. PARKER &
LONDON T. MORAWSKI
BY Barnes, Kisselle, Laughlin & Raisch
ATTORNEYS.

Oct. 2, 1956  J. J. PARKER ET AL  2,765,175
HOLDER FOR HOLLOW WORK PIECES

Filed June 28, 1954  2 Sheets-Sheet 2

INVENTORS
JOHN J. PARKER &
LONDON T. MORAWSKI
BY Barnes, Kisselle, Laughlin & Raisch
ATTORNEYS.

United States Patent Office 2,765,175
Patented Oct. 2, 1956

2,765,175

HOLDER FOR HOLLOW WORK PIECES

John J. Parker and London T. Morawski, Detroit, Mich.

Application June 28, 1954, Serial No. 439,736

12 Claims. (Cl. 279—2)

This invention relates to a device in the nature of a chuck or mandrel for holding work pieces.

The object of the invention is to provide an improved holding device with movable or articulating parts which can be shifted to engage, grip and hold a work piece while the work piece is being worked upon or otherwise treated or subjected to a gauging operation. While the device of this invention is not limited to holding work pieces which are to be subjected to cutting or grinding operations, the device is particularly desirable for such use as its construction prevents particles which result from the cutting or grinding from getting into the relatively movable work engaging parts. To this end, movable elements are provided which are encased and embodied within bodies of rubber, either natural or synthetic or other elastic or resilient or rubber like material. The accompanying drawings illustrate devices constructed in accordance with the invention.

Figure 1:
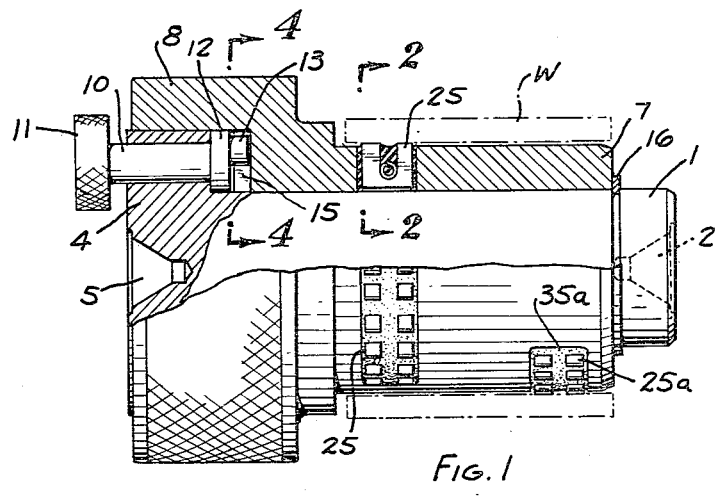
Fig. 1 is an elevational view partly in section showing one form of the invention.
Figure 4:
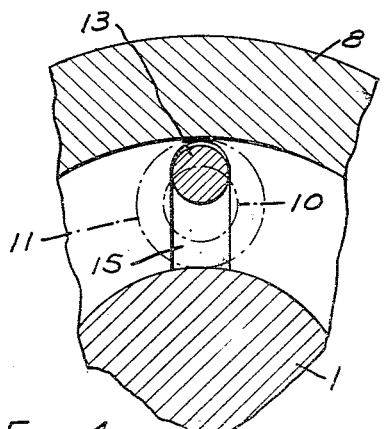
Fig. 4 is an enlarged sectional view taken on line 4—4 of Fig. 1 illustrating a tightening device.

The tool shown in Fig. 1 is one adapted to be mounted on centers of a suitable machine. It has an inner member 1 in the form of a shaft with a recess 2 at one end so that it may be mounted on a centering device, and at the other end it has an enlarged head 4 with a similar recess 5. The cooperating member 7 has a sleeve portion rotatably fitting over the shaft part 1 and an enlarged end 8 which fits over the head 4. Rotatably mounted in the head 4 is a short shaft or stud 10 with a knurled finger piece 11 and which has a head 12 and an eccentric stud 13. The stud 13 fits into a radial slot 15 in the wall defining the recess in the part 8 (Fig. 4). If the knurled finger piece is turned on its axis the throw of the eccentric stud 13 operating in the slot 15 causes relative rotation of the members 1 and 7. The two parts may be held together by a snap ring 16.

Figure 3:
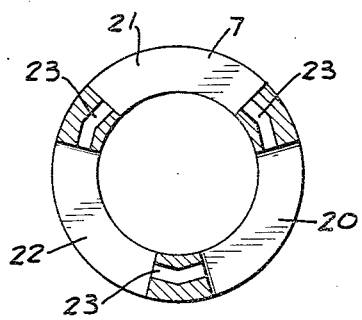
Fig. 3 is a sectional view taken through one of the members of the holder showing the construction for receiving the work gripping device.

The sleeve or bearing portion of the member 7 is provided with cut out segments forming slots 20, 21 and 22. The material between each segmental opening is formed with openings or passages 23 (Fig. 3).

Figure 2:
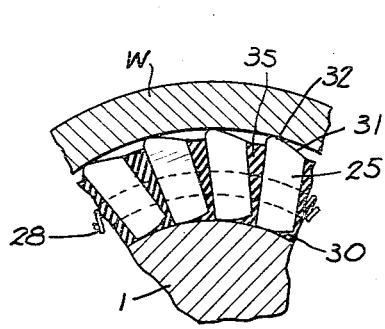
Fig. 2 is an enlarged cross sectional view taken substantially on line 2—2 of Fig. 1.

Positioned in each segmental slot are a plurality of wedge devices, each indicated at 25. Each wedge device is somewhat of U-shape, as illustrated in Fig. 1. A coil spring 28 is threaded through the openings 23 and positioned so as to lie in the bight portion of the wedges, as shown in Fig. 1, and the ends of the spring are connected so that it is an endless circumferential spring. These wedges, as shown in Fig. 2, are positioned so that they are inclined relative to a radial line passing therethrough. They are held in this position by the contracting of the spring annulus. Each wedge conveniently and preferably has a rounded surface 30 for engagement with the surface of the member 1 and has a relatively inclined outer surface 31 with a rounded tip 32.

With the wedges thus positioned in an inclined manner, and held in that position by the spring, the plurality of wedges in each segmentally shaped opening are then embedded in a body of natural or synthetic rubber or other plastic or resilient material. This may be done by pouring the material in place and letting it set. The body of material is illustrated at 35. For brevity we shall refer to this material as rubber. All of the wedges in a segmentally shaped opening are thus completely surrounded by the rubber except, of course, their inner and outer surfaces where the metal is exposed. The rubber adheres to the surfaces of the wedges and similarly adheres to the surfaces defining the segmentally shaped opening.

When the wedges are in their normal or at rest position, the outer tips 32 may lie substantially flush with the outer surface of the sleeve member 7; in other words, a circumferential line drawn around the center of the sleeve 7 and coinciding with the outermost edges 32 of the wedges 25 may have substantially the same radius as that of the outer surface of the sleeve portion 7. On the other hand, the tips 32 may project slightly outwardly of the outer surface of the sleeve 7. A work piece, such as the one shown at W, may be readily slipped over the sleeve 7 and over the inclined wedges. Then upon the turning of the finger piece 11 the shaft 1 is rocked on its axis relative to the sleeve 7. As Fig. 2 is viewed, this would be a counter-clockwise movement of the portion 1. Bearing in mind that the inner surfaces of the wedges are in engagement with the member 1, the rocking movement rocks or shifts the wedges by shifting their inner surfaces as Fig. 2 is viewed to the left, thus reducing the angularity of the respective wedges and causing their outer tips 32 to move outwardly to grip the work piece. In a tool for use with a work piece with short axial extent only one series of segmental gripping units may be employed, but as shown in Fig. 2 where a work piece has some considerable axial extent, one or more other sets of gripping devices may be employed as shown at 25a and 35a. These segments may be offset circumferentially relative to the set which has the wedges 25.

It will be seen how all the movable or articulating wedges are completely enclosed by the rubber body and thus metal cuttings and shavings and metal particles and dust incident to cutting and grinding operations are effectively prevented from entering the segmental units. Of course, the inner and outer surfaces of the wedges are exposed but these can be easily wiped off. The eccentric 13 is arranged to hold the two members 1 and 7 in a relatively rocked position so that the work piece is strongly gripped. The work piece may be released by turning the finger piece in the opposite direction at which time both the spring 28 and the rubber which was flexed in the gripping operation return the wedges to their normal retracted position.

Figure 5:
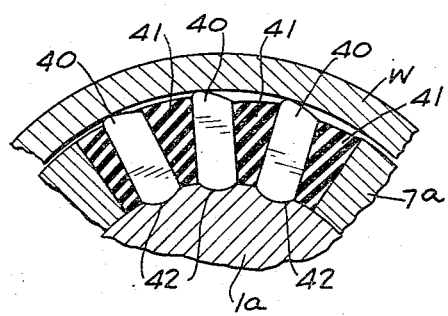
Fig. 5 is a sectional view similar to Fig. 2 illustrating a modified form of the invention.

The modified form shown in Fig. 5 is similar to the one described. The inner part is shown at 1a and the outer sleeve portion at 7a. The wedges are illustrated at 40 and they are embedded in the rubber mass or block 41. In this form, however, the part 1a is formed with a plurality of recesses 42, one for each wedge, and the inner surface of each wedge is formed on a radius so that each wedge has a rocking fit in its recess. This form may be slightly more positive in action than the form shown in Fig. 2, because there can be no slippage between the part 1a and the wedges. In this form, it may be more feasible to make the normal at rest outside diameter of the wedges no greater than or even less than the outside diameter of the sleeve.

Figure 6:
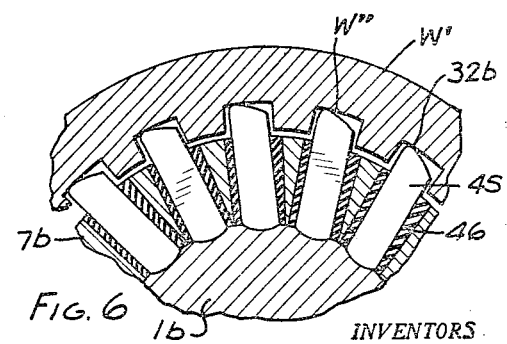
Fig. 6 is a view similar to Fig. 5 illustrating a further modified form.

In the form shown in Fig. 6, a work piece W1 with internal splines, or a work piece with an inside diameter materially greater than the outside diameter of the sleeve of the holding device may be gripped. In this case the inner member 1b may be recessed for receiving the wedges 45 and the wedges are encased in the rubber body 46. However, the wedges project a substantial distance outwardly from the sleeve member 7b so that their outer working portions 32b are spaced radially outwardly from the sleeve portion 7b. It will be observed by reference to Fig. 6 that the work piece W' is of internal splined construction and that each wedge fits into a groove of the splined construction so as to engage the bottom surface W" thereof. In like manner, this tool may engage a work piece with a smooth surface where its internal diameter is the same as the several surfaces W".

Figure 7:
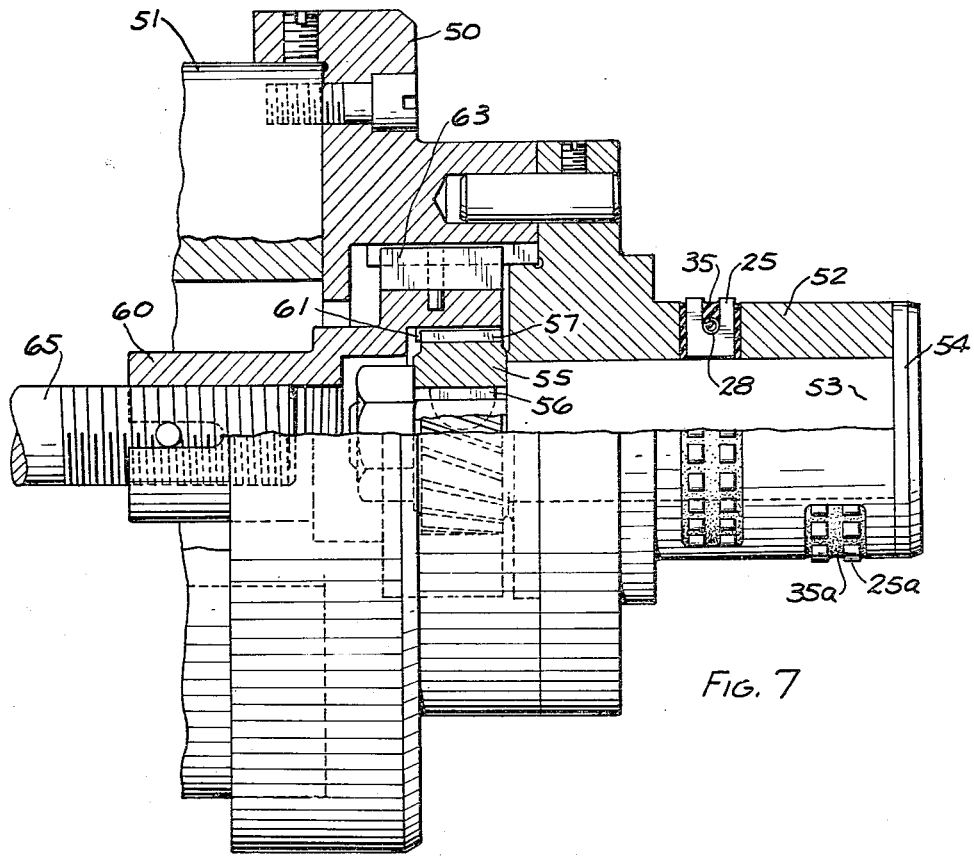
Fig. 7 is a view of a tool adapted to be placed upon the rotary head or spindle of a machine and which embodies the holder of the invention.

The form shown in Fig. 7 is of the type for mounting upon a machine tool and it may have the same gripping elements as those shown in Fig. 1, and indeed the same reference characters are applied to these elements. The outer member has a part 50 arranged to be mounted upon a rotary head or spindle head 51 of a machine tool and it has a sleeve portion 52 which carries the gripping devices. The inner member 53 fits within the sleeve, has a head 54 and a toothed element 55 keyed thereto as at 56. The teeth 57 are helically disposed as shown. A member 60 has cooperating helical teeth 61 which are in dental engagement with the teeth 57 and this member is slidably keyed as at 63 to the member 50. It will be observed that axial movement of the member 60 may be given to the member 60 by an operating rod 65 which may be operated by any suitable means, either manual or by power. Thus, when a work piece is applied and the rod 65 shifted axially the member 53 is rocked and the wedges are caused to be articulated to grip the work.

The device of this invention, as aforesaid, is a work holder; it may be specifically termed a chuck where it is attached to a spindle, as shown in Fig. 7, or a mandrel where it is to be positioned between centers as shown in Fig. 1. If a work piece having two or more internal diameters is to be employed, the holding devices may be positioned on two or more diameters to respectively engage the two or more diameters of the work piece.

We claim:

1. A holder for work pieces comprising an outer member of sleeve form, an inner member rockably fitting within the outer member, the outer member having a radially disposed slot therethrough, a plurality of wedge members positioned in the slot each positioned angularly relative to a radial line passing therethrough, a body of resilient rubber-like material in the slot in which the wedges are embedded with their inner surfaces exposed and in engagement with the inner member and with their outer surfaces exposed, the outer member and the wedges adapted to have a hollow work piece placed thereover, and means for relatively rocking the inner and outer members whereby the surface of the inner member engages the inner surfaces of the wedges and rock the wedges to reduce the angularity thereof and cause the outer surfaces thereof to engage and grip the work piece.

2. A holder for work pieces comprising an outer member of sleeve form, an inner member rockably fitting within the outer member, the outer member having a radially disposed slot therethrough, a plurality of wedge members positioned in the slot each positioned angularly relative to a radial line passing therethrough, said wedges being spaced from each other, a body of resilient rubber-like material in the slot in which the wedges are embedded with their inner surfaces exposed and in engagement with the inner member and with their outer surfaces exposed, the outer member and the wedges adapted to have a hollow work piece placed thereover, and means for relatively rocking the inner and outer members whereby the surface of the inner member engages the inner surfaces of the wedges and rock the wedges to reduce the angularity thereof and cause the outer surfaces thereof to engage and grip the work piece.

3. A holder for work pieces comprising, an outer member of sleeve form, an inner member rockably fitting within the outer member, the outer member having a segmentally shaped slot extending therethrough, a plurality of wedge members positioned in the slot and positioned angularly relative to a radial line passing therethrough, a body of resilient rubber-like material substantially filling the slot and in which the wedges are embedded with their inner surfaces exposed and in engagement with the inner member and with their outer surfaces exposed, the outer member and the wedges adapted to have a hollow work piece placed thereover, and means for relatively rocking the inner and outer members whereby the inner member engages the inner surfaces of the wedges and rocks the wedges to reduce the angularity thereof and cause their outer surfaces to engage and grip the work piece.

4. A holder for work pieces comprising, an outer member of sleeve form, an inner member rockably fitting within the outer member, the outer member having a segmentally shaped slot extending therethrough, a plurality of wedge members positioned in the slot, spaced from each other, and positioned angularly relative to a radial line passing therethrough, a body of resilient rubber-like material substantially filling the slot and in which the wedges are embedded with their inner surfaces exposed and in engagement with the inner member and with their outer surfaces exposed, the outer member and the wedges adapted to have a hollow work piece placed thereover, and means for relatively rocking the inner and outer members whereby the inner member engages the inner surfaces of the wedges and rocks the wedges to reduce the angularity thereof and cause their outer surfaces to engage and grip the work piece.

5. A holder for a work piece comprising an outer member of sleeve form, an inner member rockably fitting within the outer member, the outer member having a plurality of segmentally shaped and circumferentially arranged slots therethrough, a plurality of wedge members in each slot and each positioned angularly relative to a radial line passing therethrough, a body of resilient rubber-like material in each slot, the wedges being embedded in the rubber-like material and having their inner surfaces exposed and in engagement with the inner member and having their outer surfaces exposed, the outer member and the wedges adapted to have a hollow work piece placed thereover and means for relatively rocking the inner and outer members whereby the surface of the inner member engages the inner surfaces of the wedges and rocks the wedges to reduce the angularity thereof and cause their outer surfaces to engage and grip the work piece.

6. A holder for a work piece comprising an outer member of sleeve form, an inner member rockably fitting within the outer member, the outer member having a plurality of segmentally shaped and circumferentially arranged slots therethrough, a plurality of wedge members in each slot and each positioned angularly relative to a radial line passing therethrough, a body of resilient rubber-like material in each slot bonded to the wedge members and the surfaces of the outer member which define said slots, the wedges being embedded in the rubber-like material and having their inner surfaces exposed and in engagement with the inner member and having their outer surfaces exposed, the outer member and the wedges adapted to have a hollow work piece placed thereover and means for relatively rocking the inner and outer members whereby the surface of the inner member engages the inner surfaces of the wedges and rocks the wedges to reduce the angularity thereof and cause their outer surfaces to engage and grip the work plate.

7. A holder for work pieces comprising, an outer member of sleeve form, an inner member rockably fitting within the outer member, the outer member having a slot extending therethrough, at least one wedge member positioned in the slot and disposed angularly relative to a radial line passing therethrough, a body of resilient rubber-like material in the slot and embedding the wedge member, the wedge member having its inner member exposed and in engagement with the inner member, and having its outer surface exposed, the outer member and the wedge member adapted to have a hollow work piece placed thereover and means for relatively rocking the inner and outer members whereby the surface of the inner member engages the inner surface of the wedge and rocks the wedge to reduce the angularity thereof and cause the outer surface to engage and grip the work piece.

8. A holder for a work piece comprising, a first member of sleeve form, said member having a slot therein, a plurality of wedge members positioned in the slot, each wedge member being positioned angularly relative to a radial line passing therethrough, a body of resilient rubber-like material in the slot and substantially embedding the wedge members, the wedge members having their inner and outer surfaces exposed, said first member and the wedges adapted to have a work piece disposed telescopingly relative thereto, a second member disposed telescopingly relative to the first member and being rockable relative thereto, the surfaces of the wedge members at one end of the wedge members being in engagement with the adjacent surface of the second member, and means for relatively rocking the first and second members whereby the surface of the second member engages end surfaces of the wedges and rocks the wedges to reduce their angularity and cause the surfaces at the opposite end of the wedges to engage and grip the work piece.

9. A holder for work pieces comprising, an outer member of sleeve form, an inner member rockably fitting within the outer member, the outer member having a slot therethrough, a plurality of wedge members positioned within the slot, each wedge member being positioned angularly relative to a radial line passing therethrough, a body of resilient rubber-like material in the slot and in which the wedges are embedded with their inner and outer surfaces exposed, the inner member having a plurality of recesses, one for each wedge member, and the inner surface of each wedge member being rockably seated in one such recess, the outer member and the wedge members adapted to have a hollow work piece placed thereover and means for relatively rocking the inner and outer members whereby the inner member rocks the wedges to reduce their angularity and to cause their outer surfaces to engage and grip a work piece.

10. A holder for work pieces comprising, an outer member of sleeve form, an inner member rockably fitting within the outer member, the outer member having a plurality of slots therethrough, a wedge member positioned in each slot, each wedge member being angularly disposed relative to a radial line passing therethrough, a body of resilient rubber-like material in each slot substantially surrounding and embedding the wedge therein, the inner and outer surfaces of the wedges being exposed, said wedges adapted to have a hollow work piece placed thereover and means for relatively rocking the inner and outer members whereby the surface of the inner member engages the inner surfaces of the edges and rocks the wedges to reduce the angularity thereof and cause their outer surfaces to engage and grip the work piece.

11. A holder for work pieces comprising, an outer member of sleeve form, an inner member rockably fitting within the outer member, the outer member having a plurality of slots therethrough, a wedge member positioned in each slot, each wedge member being angularly disposed relative to a radial line passing therethrough, a body of resilient rubber-like material in each slot substantially surrounding and embedding the wedge therein, the inner and outer surfaces of the wedges being exposed, each wedge extending radially outwardly beyond the outside surface of the outer member, said wedges adapted to have a hollow work piece placed thereover and means for relatively rocking the inner and outer members whereby the surface of the inner member engages the inner surfaces of the edges and rocks the wedges to reduce the angularity thereof and cause their outer surfaces to engage and grip the work piece.

12. A holder for a work piece comprising, a first member of sleeve form, said member having slots therein, a plurality of wedge members with at least one wedge member in each slot, each wedge member being positioned angularly relative to a radial line passing therethrough, a body of resilient rubber-like material in the slots and substantially embedding the wedge members, the wedge members having their inner and outer surfaces exposed, said first member and the wedge members adapted to have a work piece disposed telescopingly relative thereto, a second member disposed telescopingly relative to the first member and being rockable relative thereto, the surfaces of the wedge members at one end of the wedge members being in engagement with the adjacent surface of the second member, and means for relatively rocking the first and second members whereby the surface of the second member engages end surfaces of the wedge members and rocks the wedge members to reduce the angularity and cause the surfaces at the opposite end of the wedge members to engage and grip the work piece.

References Cited in the file of this patent

UNITED STATES PATENTS

| 1,188,369 | Chernack | June 20, 1916 |
| 2,346,706 | Stoner | Apr. 18, 1944 |
| 2,440,908 | Mueller | May 4, 1948 |
| 2,468,867 | Collins | May 3, 1949 |

FOREIGN PATENTS

| 872,886 | Germany | Apr. 9, 1953 |